United States Patent [19]

Grinde

[11] Patent Number: 4,860,927

[45] Date of Patent: Aug. 29, 1989

[54] BLOW MOLDED TWO-COMPARTMENT CONTAINER

[76] Inventor: James E. Grinde, 2401 - 147th La., NE., Anoka, Minn. 55303

[21] Appl. No.: 278,008

[22] Filed: Nov. 30, 1988

Related U.S. Application Data

[63] Continuation of Ser. No. 79,042, Jul. 29, 1987, abandoned.

[51] Int. Cl.$^4$ ............................................. G01F 11/26
[52] U.S. Cl. .................................... 222/158; 222/454; 222/465.1
[58] Field of Search ........ 222/454, 158, 129, 455-457, 222/465.1, 584, 481, 482

[56] References Cited

U.S. PATENT DOCUMENTS 4,646,948 3/1987 Jennings ............................. 222/454

FOREIGN PATENT DOCUMENTS 2116522 9/1983 United Kingdom ................ 222/454

*Primary Examiner*—Kevin P. Shaver
*Attorney, Agent, or Firm*—Orrin M. Haugen; Thomas J. Nikolai; Frederick W. Niebuhr

[57] ABSTRACT

A bottle is specially designed for storing, measuring and dispensing liquids or pourable granular materials having a lower relatively large capacity reservoir for storing the material to be later measured and dispensed and an upper measuring chamber of a lesser capacity and having raised graduated marks thereon indicating a plurality of predetermined measured capacities. The lower and upper chambers are in fluid communication with one another by a passageway formed internally of the bottle. The passageway is configured so that when the bottle is tipped, a quantity of fluid may be transferred from the storage reservoir into the measuring chamber until a desired quantity has been transferred into that chamber. Formed in the top of the measuring chamber is a pour spout having a cap thereon which, when removed, can allow the measured quantity to be dispensed from the measuring chamber. Because of the manner in which the passageways are configured, tipping the bottle to dispense the contents of the measuring chamber does not result in a flow of further material from the storage chamber into the measuring chamber.

6 Claims, 1 Drawing Sheet

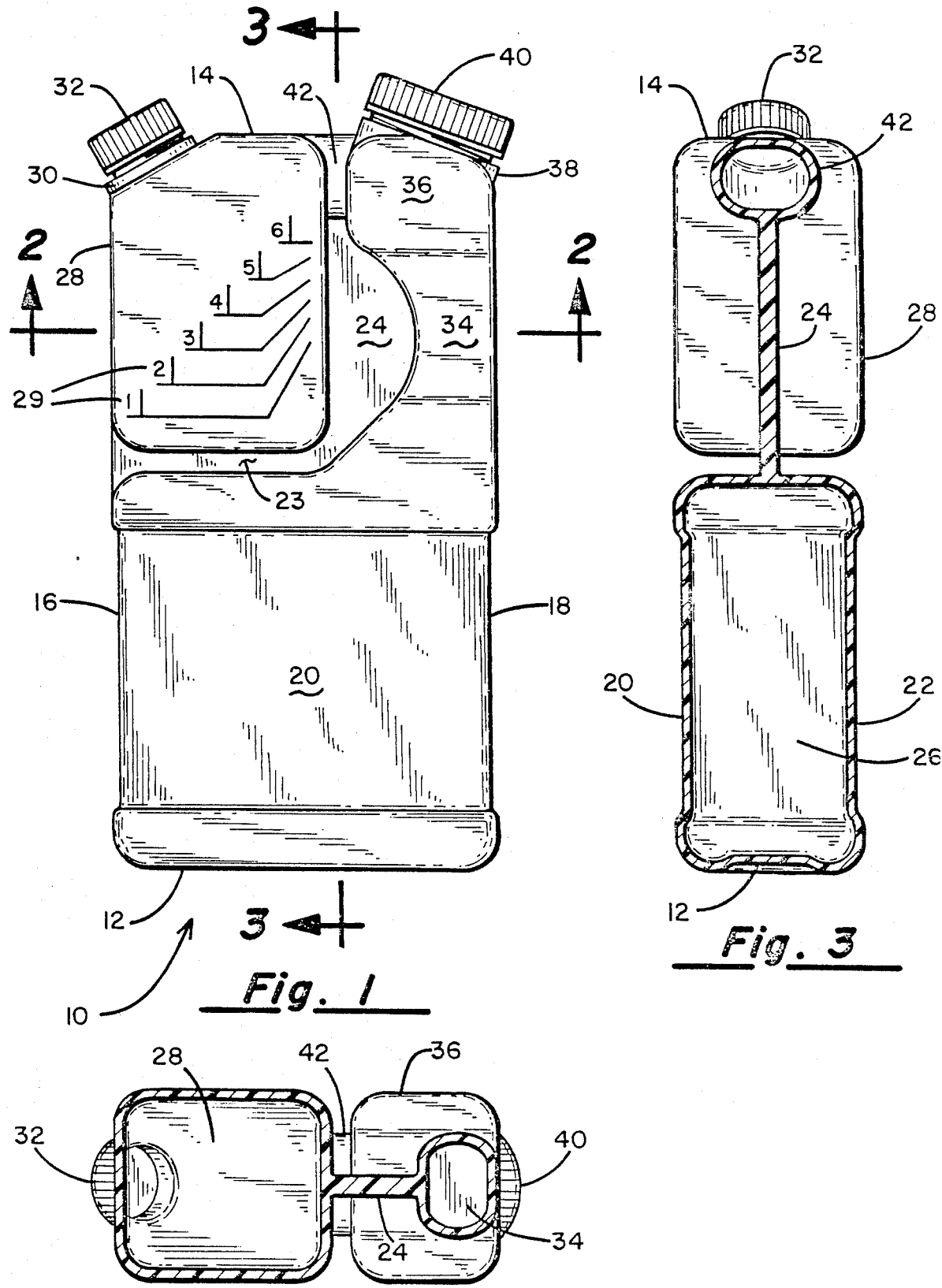

BLOW MOLDED TWO-COMPARTMENT CONTAINER

This is a Continuation of application Ser. No. 07/079,042, filed July 29, 1987, now abandoned.

BACKGROUND OF THE INVENTION

I. Field of the Invention:

This invention relates generally to liquid storage, measuring and dispensing apparatus, and more particularly to a unitary molded container which is effectively divided into two chambers, one being of a relatively large volume for storing a quantity of a liquid and the other being of a smaller volume or capacity for containing measured amounts of the liquid transferred to it from the larger chamber via a passageway connecting the two.

II. Discussion of the Prior Art:

In the Jennings Pat. No. 4,298,038 there is described a bottle-like vessel including first and second compartments, one being generally rectangular and of a larger capacity than the other and the two being joined by a horizontally extending passageway located proximate the pour spout of the larger compartment. The smaller capacity measuring compartment in the Jennings device is triangular in shape with the apex of the triangle being generally opposite the horizontally extending passageway. The smaller measuring compartment is also provided with a pour spout having a removable closure cap screwed thereon. The Jennings container also requires a valve mechanism operatively disposed at the entrance of the passageway leading from the larger volume compartment to the smaller volume measuring compartment. In use, liquids stored in the larger rectangular compartment can be dispensed by first tipping the bottle assembly and manipulating the valve to transfer a portion of the liquid from the main chamber or reservoir into the measuring compartment via the transfer passageway. Graduated markings on the measuring compartment allow the user to determine with some precision the number of liquid ounces of material contained within the measuring compartment. That measured quantity can then be poured from the vessel by removing the cap from the measuring compartment and tipping the vessel to allow the measured volume to be poured out. At this time, of course, the valve at the entrance to the transfer passageway will be closed to block transfer to additional liquid from the main reservoir into the measuring compartment during the dispensing of its contents.

Measuring vessels made in accordance with the Jennings patent suffer certain drawbacks. Specifically, in the event that the user inadvertently transfers more than a desired amount of the liquid from the main reservoir into the measuring compartment, it is difficult to return a portion of the overage back into the main reservoir from the triangular shaped measuring compartment. The triangular shape of the measuring compartment and the location and shape of the passageway precludes the reverse transfer of liquid by simply tipping the container in the opposite direction. When such a maneuver is attempted, more liquid from the main reservoir tends to flow into the measuring compartment rather than the reverse. The Jennings device is unsuitable for granular materials because the valve becomes clogged by such solid materials.

Moreover, the need to include a manually operated valve mechanism in the bottle necessarily renders it more costly to manufacture than if the valve is eliminated.

OBJECTS

It is accordingly a principal object of the present invention to provide a new and improved vessel for storing, measuring and dispensing liquids or pourable granular materials.

Another object of the invention is to provide a two-chamber style storage, measuring and dispensing vessel in which liquids or pourable granular material can be transferred from a main storage reservoir into a measuring chamber by tipping the vessel and eliminating the need for a manual valve to subsequently isolate the two chambers.

Yet another object of the invention is to provide an integrally formed storage, measuring and dispensing vessel in which the material to be measured and dispensed can be readily transferred back and forth between the measuring chamber and the storage reservoir so that the measured quantity can be precisely adjusted or, if desired, completely transferred back from the measuring chamber to the storage reservoir.

SUMMARY OF THE INVENTION

These and other objects and advantages of the invention are attained through proper attention to the overall geometry of the storage, measuring and dispensing device. More particularly, the vessel of the present invention may be molded from a suitable transparent or translucent thermoplastic material so as to form a generally hollow rectangular parallelepiped having mutually perpendicular, generally rectangular top, bottom, side and end walls. At a predetermined height above the bottom wall, the front and rear side walls are deformed inwardly and come together to form a horizontal seam line which extends from one end surface of the container toward, but a predetermined distance short of the opposed end wall. The front and rear side walls are also depressed inwardly and come together to form a vertically extending, centrally disposed seam which projects upward from the aforementioned horizontal seam line, but falls short of the top surface of the vessel. As such, these two mutually intersecting seams define a generally rectangular measuring chamber which is in liquid communication with the remaining storage portion of the container by way of the passageways created between the joined seam surfaces and the respective end wall and top wall of the vessel. The effective height of the storage compartment is designed to be greater than or equal to the distance between the end wall and the vertical seam line. In addition, the vertically extending seam line is formed with a convex curvature. This geometric design thus places the break-over position of the container as it is tipped from the vertical toward the horizontal, well above the entrance of the passageway leading between the measuring chamber and the storage reservoir portion of the container. As such, it is possible to pour liquid or granular solids in both directions, that is from the storage reservoir into the measuring chamber and from the measuring compartment back into the storage reservoir and no valve mechanism is needed to accomplish this end. Thus, the container of the present invention finds diverse applications in storing and dispensing a wide variety of products, e.g., petroleum, liquid fertilizers, photographic chemicals, drugs, medicines, disinfectants, etc.

DESCRIPTION OF THE DRAWINGS

The various objects and advantages of the invention will become apparent to those skilled in the art from the following detailed description of a preferred embodiment, especially in conjunction with the accompanying drawings in which like numerals in the several views refer to corresponding parts.

FIG. 1 is a front view of the storage, measuring and dispensing vessel prepared in accordance with the preferred embodiment;

FIG. 2 is a cross-sectional view taken along the line 2—2 in FIG. 1; and

FIG. 3 is a cross-sectional view taken along the line 3—3 in FIG. 1.

DESCRIPTION OF THE PREFERRED EMBODIMENT

Referring to FIG. 1, there is illustrated by means of a front elevation view, a storage, measuring and dispensing vessel comprising a preferred embodiment. The vessel or bottle is indicated generally by numeral 10 and has the form of a rectangular parallelepiped with a bottom wall 12, a top wall 14, left and right end walls 16 and 18 and front and rear walls 20 and 22, respectively. The vessel or bottle 10 is preferably formed from a suitable thermoplastic material, such as high density polyethylene, and is sufficiently transparent or translucent so that the level of contents contained therein can be discerned through the walls thereof.

During the molding operation, a web-like seam 23 is formed which extends horizontally inward from the left end surface 16, the web intersecting with a further vertically extending web 24 to effectively partition the vessel into two generally rectangular chambers 26 and 28. The chamber 26 has a substantially greater volume or capacity than the chamber 28 and, accordingly, is referred to herein as the storage chamber or reservoir. The side wall of the compartment 28 is provided with raised graduated markings as at 29 and is therefore referred to as the measuring chamber. Formed through the top surface 14 of the vessel 10 and communicating with the measuring chamber 28 is a pour spout 30 which is treated to receive a removable closure cap 32.

The vertical web 24 has an arcuate contour as can best be seen in the plan view of FIG. 1. This not only facilitates gripping of the vessel 10 with the thumb on one side of the web and the forefinger of the hand in the corresponding recess on the reverse side of the container, but also defines a break-over line for fluid flow when the bottle is tipped counterclockwise (when viewed as in FIG. 1). The arcuate web 24 terminates short of the right-most end wall 18 of the container 10 and defines a neck zone 34 between the storage chamber 26 and a relatively small upper reservoir 36. The tubular neck 34 converges in at least three directions to a minimum cross-sectional area at the closest point where the arcuate web 24 is spaced from end wall 18. The neck then diverges to form a generally rectangular filling chamber 36. A second filling spout 38 is formed through the top surface 14 of the vessel and leads to the small upper reservoir which is thus referred to as a filling chamber This spout is also threaded to receive a screw-on cap 40. The spout 38 may be of a somewhat larger diameter than the spout 30 to facilitate filling of the container without the need for a funnel or the like.

Extending between the small upper reservoir or filling chamber 36 and the upper portion of the measuring chamber 28 is a tubular passageway 42 which permits the transfer of liquid or granular material from the storage reservoir 26 into the measuring chamber 28 and vice versa.

The convex curvature of the web 24 in the neck zone 34 establishes a break-over position for the container when it is tipped so as to empty the contents of the measuring chamber out through its pour spout 30. This break-over position is well above the passage 42 from the storage chamber into the measuring chamber. This permits the bottle to be tipped to an extent where the entire contents of the measuring chamber 28 can be poured out through the spout 30 and without reaching the point where the liquid in the storage chamber can flow beyond the convex rise in web 24 and spill out as an unmeasured quantity. In the case of the prior art Jennings bottle, this is not true and a valve is needed to prevent this from happening.

In use, a liquid or pourable granular material may be introduced into the vessel 10 through the opening 38, following removal of the screw cap 40. With no limitation intended, the bottle may be dimensioned to store a quart or more of material in the chamber 26 thereof below the seam 23. To measure out a quantity, the bottle is tipped counterclockwise from its position shown in FIG. 1 and when tipped sufficiently far to cause the material to flow over the arcuate web 24, it will now flow through the tubular opening 42 into the measuring chamber 28. The raised graduated markings in the semitransparent bottle can then be used to gauge the number of ounces transferred from the storage chamber 26. When a desired quantity has been reached, the user will return the container to its upright position and the premeasured quantity will remain in the chamber 28. To dispense it, the cap 32 will be removed and the bottle again tipped, but not to the extent that material will flow over the arcuate web 24. The entire contents of the chamber 28 can thus be emptied without having additional fluid material spill over the convex rib 24.

If, by accident, too much fluid material is allowed to be transferred into the measuring chamber 28, the overage can readily be transferred back by tipping the bottle clockwise relative to FIG. 1. The enlarged volume of filling chamber 36 proximate the tubular passage 42 can receive the last remaining portion of fluid being returned to the storage chamber 26 during this operation, allowing a complete pour-back of the fluid introduced into the measuring chamber 28. Whereas in the container designed in accordance with the Jennings U.S. Pat. No. 4,298,038, an attempt to pour back the contents of its triangular measuring compartment into its storage compartment by tipping the container clockwise (when oriented as in FIG. 1 hereof) causes the contents of the storage compartment to fill the passageway between the two with liquid and precludes any more liquid from being returned from the measuring compartment. With the present invention, the filling chamber 36 at the intersection of the neck 38 with the horizontal passageway 42 provides a sufficient volume capacity to receive the remaining contents of the chamber 28 when the container is tipped clockwise (FIG. 1) beyond the point where the end wall 18 is horizontal. This assumes, of course, that the container was not originally overfilled to a level above the horizontal web 23.

The container of the present invention affords still another advantage over the prior art Jennings bottle in that its generally rectangular measuring chamber is capable of holding about twice as much measuring material as a triangular compartment like that of Jennings.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A container for storing, measuring and dispensing pourable material comprising:
   (a) a generally rectangular, hollow, molded bottle having mutually perpendicular bottom, top, end and side walls, said side walls being parallel and spaced apart except for being joined along a first, generally horizontal web extending inwardly from one end wall toward, but short of, the opposed end wall at a predetermined height above said bottom wall and a second, vertically extending web joined to said horizontal web at a right angle at the internal terminus of said horizontal web and extending toward, but short of, said top wall, said webs partitioning said generally rectangular bottle into:
      (i) a lower, relatively large capacity reservoir having a tubular neck extending vertically along one of said end walls, said tubular neck converging in three directions to a minimum cross-sectional area generally midway along said vertically extending web and then diverging to form a generally rectangular filling chamber proximate said top wall,
      (ii) an upper, generally rectangular measuring chamber having a storage capacity greater than that of said filling chamber and less than that of said large capacity reservoir, and
      (iii) a connecting tube extending along said top wall and joining the filling chamber and said measuring chamber;
   (b) a first opening formed through said top wall leading into said filling chamber;
   (c) a second opening formed through said top wall leading into said measuring chamber; and
   (d) first and second removable closure means for sealing said first and second openings.

2. The container as in claim 1 wherein said predetermined height is at least as great as the length of said horizontal web.

3. The container as in claim 1 wherein said filling chamber has a capacity sufficient to allow the entire contents of said measuring chamber to be returned to said relatively large capacity reservoir when said container is tipped in a direction opposite to the direction it is tipped to transfer material from said large capacity reservoir through said tubular passageway to fill said measuring chamber.

4. The container as in claim 1 wherein said second vertically extending web includes a convex curvature web portion along a predetermined portion of said neck.

5. The container as in claim 1 and further including graduated markings on at least one of said side walls proximate said measuring chamber.

6. The container as in claim 1 wherein said bottle is molded from a thermoplastic material.

* * * * *